(12) United States Patent
Slattery (10) Patent No.: US 9,527,571 B2
(45) Date of Patent: Dec. 27, 2016

(54) SUPERPLASTICALLY FORMED ULTRASONICALLY WELDED METALLIC STRUCTURE

(71) Applicant: The Boeing Company, Chicago, IL (US)

(72) Inventor: Kevin Slattery, Saint Charles, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/338,586

(22) Filed: Jul. 23, 2014

(65) Prior Publication Data

US 2014/0332630 A1    Nov. 13, 2014

Related U.S. Application Data

(62) Division of application No. 13/786,319, filed on Mar. 5, 2013, now Pat. No. 8,844,796.

(51) Int. Cl.
*B23K 20/12*    (2006.01)
*B23K 20/00*    (2006.01)
(Continued)

(52) U.S. Cl.
CPC ............. *B64C 1/061* (2013.01); *B21D 26/055* (2013.01); *B21D 26/059* (2013.01); *B23K 20/10* (2013.01); *B23P 17/04* (2013.01); *B32B 3/28* (2013.01); *B32B 15/01* (2013.01); *B32B 15/016* (2013.01); *B32B 15/017* (2013.01); *B23K 2203/18* (2013.01); *Y10T 29/49805* (2015.01); *Y10T 428/1241* (2015.01); *Y10T 428/24661* (2015.01)

(58) Field of Classification Search
CPC ....... B23K 20/122; B23K 28/02; B23K 20/00; B23K 20/10; B23K 20/1225; B23K 20/123; B23K 20/1235; B23K 20/1245; B23K 20/1265; B23K 20/1275; B23K 20/14; B23K 2201/18; B23K 2203/10; B23K 2203/12; B23K 2203/18; B23K 31/02; B23K 37/08; C22C 21/06
USPC ..... 228/110.1, 1.1, 111, 112.1, 113, 114, 2.1
See application file for complete search history.

(56) References Cited

U.S. PATENT DOCUMENTS 4,304,821 A    12/1981   Hayase et al.
4,351,470 A    9/1982    Swadling et al.
(Continued)

FOREIGN PATENT DOCUMENTS

EP    0502620    9/1992
EP    1455965    9/2004
(Continued)

OTHER PUBLICATIONS

European Patent Appln. No. 14157888.0 Extended European Search Report dated Jun. 27, 2014, 6 pages.

*Primary Examiner* — Erin Saad
(74) *Attorney, Agent, or Firm* — Patterson + Sheridan LLP (57) ABSTRACT

Disclosed herein is a method of making a structure by ultrasonic welding and superplastic forming. The method comprises assembling a plurality of workpieces comprising a first workpiece including a first material having superplastic characteristics; ultrasonically welding the first workpiece to a second workpiece, to form an assembly; heating the assembly to a temperature at which the first material having superplastic characteristics is capable of superplastic deformation, and injecting a fluid between the first workpiece and the second workpiece to form a cavity between the first workpiece and the second workpiece.

41 Claims, 5 Drawing Sheets

(51) Int. Cl.

| | |
|---|---|
| *B23K 20/10* | (2006.01) |
| *B64C 1/06* | (2006.01) |
| *B23P 17/04* | (2006.01) |
| *B32B 3/28* | (2006.01) |
| *B32B 15/01* | (2006.01) |
| *B21D 26/055* | (2011.01) |
| *B21D 26/059* | (2011.01) |

(56) References Cited

U.S. PATENT DOCUMENTS

| | | |
|---|---|---|
| 4,534,503 A | 8/1985 | Stephen et al. |
| 4,607,783 A | 8/1986 | Mansbridge et al. |
| 4,632,296 A | 12/1986 | Mansbridge et al. |
| 5,143,276 A | 9/1992 | Mansbridge et al. |
| 5,181,969 A | 1/1993 | Komatsubara et al. |
| 5,942,314 A | 8/1999 | Fisher et al. |
| 5,994,666 A | 11/1999 | Buldhaupt et al. |
| 7,146,727 B2 | 12/2006 | Kistner et al. |
| 7,568,608 B1 | 8/2009 | Ding |
| 2001/0022023 A1 | 9/2001 | Wallis |
| 2006/0255098 A1 | 11/2006 | Runyan |
| 2009/0057489 A1 | 3/2009 | Goldfinch et al. |
| 2011/0062221 A1 | 3/2011 | Johnson |

FOREIGN PATENT DOCUMENTS

| | | |
|---|---|---|
| JP | 2003 291892 A | 10/2003 |
| JP | 2004 351514 A | 12/2004 |

# SUPERPLASTICALLY FORMED ULTRASONICALLY WELDED METALLIC STRUCTURE

RELATED APPLICATIONS

The present application is a divisional of co-pending U.S. Non-Provisional patent application Ser. No. 13/786,319, filed Mar. 5, 2013, the contents of which are incorporated herein by reference in their entirety.

BACKGROUND

Superplastic forming (SPF) is a fabrication technique capable of forming large and complex workpieces in one operation. Materials having superplastic characteristics exhibit an enhanced ability to be plastically deformed without rupture, a property known as superplasticity. This property is exhibited, for example, by certain fine-grained metals at a homologous temperature, which is a fraction of the material's melting point.

A typical SPF process involves placing one or more worksheets of a material having superplastic characteristics in a die, heating the worksheets to a temperature within the superplastic range, and superplastically forming the sheet(s) at the SPF temperature. Usually, a differential forming pressure from a gas manifold is used to stretch the worksheet(s) into the desired shape against the die surface(s). One advantage of SPF is that complex shapes can be formed from sheet metal so that the time and expense of milling are eliminated with great cost saving. SPF methods are also usually applicable to single and multisheet fabrication.

For multisheet fabrication, SPF is combined with joining processes to produce sandwich structures from stacks of two or more worksheets. For example, combination of SPF with diffusion bonding (DB) is well documented and has been used in the aerospace industry for many years. Also popular is the combination of SPF/brazing, where a brazing compound is applied where bonding is desired, SPF is carried out, and then the faying surfaces are brazed.

However, not all materials having superplastic characteristics are suitable for traditional joining processes. This applies, in particular, to certain alloy systems, particularly those of aluminum, magnesium, and beryllium, which do not lend themselves easily to DB or brazing. Without being bound to any theory, the main obstacle appears to be the tendency of such metals and their alloys to form tenacious and chemically stable surface oxide layers that interfere with the formation of a metal-to-metal contact between the faying surfaces during welding. Oxide layers are particularly troublesome in the case of aluminum; aluminum oxide is denser than and has a melting point that is twice that of pure aluminum. Accordingly, prior to welding, steps for cleaning off the oxide layer are usually needed, for example with a wire brush and/or acetone, so that the material underneath the oxide layer can be exposed.

Another disadvantage of DB relates to instances where one or more of the sheets do not react well to heat treatments, such as the protracted heating typical of DB. Moreover, DB may not be applicable in instances where one or more of the sheets to be joined are heterogeneous in nature, such as a sheet having a first side of a first alloy characterized by a melting temperature of 500° C., and a second side of a second alloy whose melting temperature is 700° C. instead. A temperature sufficient for carrying out DB on the first side of the sheet is likely too low for the second side; conversely, a temperature sufficient for performing DB on the second side may induce undesirable melting of the first side. Additionally, in processes including both SPF and DB, the majority of the cycle time is taken by the DB. Typically, such processes are carried out either in a die, tying up a valuable asset, or in a dedicated furnace, which means additional equipment is needed.

SUMMARY

These and other features, aspects and advantages of the disclosure will become better understood with reference to the following drawings, description and claims.

In one aspect, there is provided a method of making a structure by ultrasonic welding and superplastic forming. The method comprises assembling a plurality of workpieces comprising a first workpiece comprising a first material having superplastic characteristics; ultrasonically welding the first workpiece to a second workpiece, to form an assembly; heating the assembly to a temperature at which the first material having superplastic characteristics is capable of superplastic deformation, and injecting a fluid between the first workpiece and the second workpiece to form a cavity between the first workpiece and the second workpiece.

In a second aspect, there is provided a multisheet structure comprising a first sheet comprising at least one superplastically formed corrugation and a second sheet ultrasonically welded to the first sheet.

In a third aspect, there is provided an airframe comprising at least one superplastically formed corrugation and a second sheet ultrasonically welded to the first sheet.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

The present disclosure is based on the discovery of a novel process combining SPF and ultrasonic welding, hereinafter also referred to as "SPF/UW." This process allows for the bonding and superplastic forming of metals and alloy systems difficult to join by traditional welding techniques, and is also applicable to joining sheets of differing compositions. Without being bound to any particular theory, it is believed that the vibrations associated with ultrasonic welding break up oxide layers on the surface of workpieces, thereby making steps for removing such layers unnecessary and promoting and facilitating metal-to-metal contact and therefore bonding between the faying surfaces. As an added advantage, by replacing lengthy and high temperature DB steps, energy and time are saved.

Accordingly, in one aspect, there is provided a method of making a structure. A plurality of workpieces is provided, at least one of which includes a superplastic material. The workpieces are joined together to form an assembly; in particular, a first workpiece including a superplastic material is ultrasonically welded to at least another, second workpiece. The assembly is heated to a temperature at which the superplastic material is capable of superplastic deformation, and a fluid is injected between the first workpiece and the second workpiece, to form a cavity between the two. Exemplary fluids include inert gases such as helium, argon, and nitrogen. Different cavity sizes and shapes may be obtained by varying the applied fluid pressure and forming cavities within a mold having a desired shape.

Figure 1A:
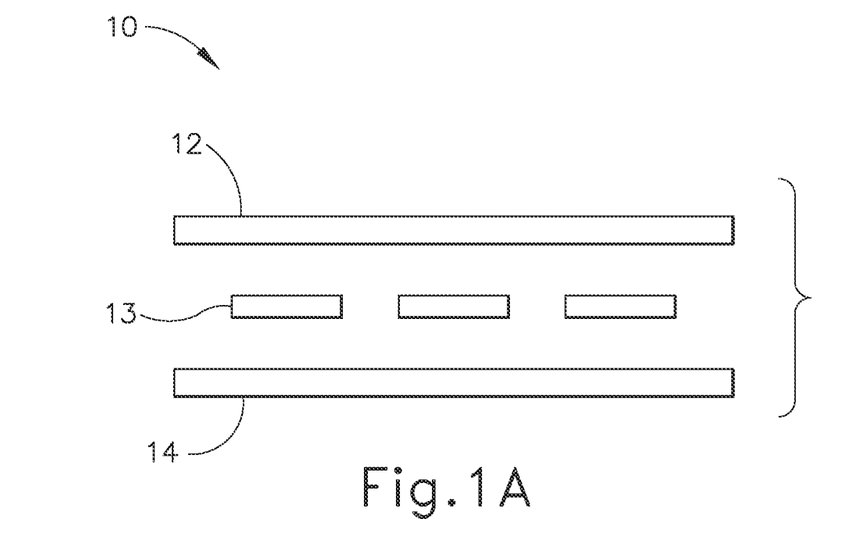
FIGS. 1A-1D illustrate a method of manufacturing a structure by ultrasonic welding and superplastic forming.
Figure 1B:
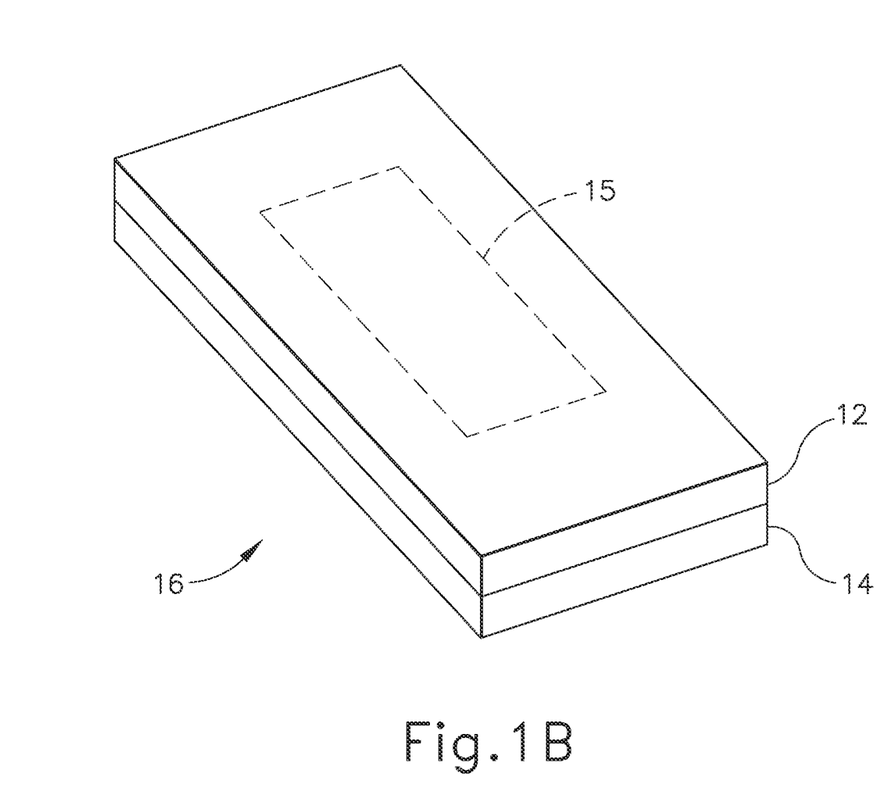

A representative example of the method is illustrated in FIGS. 1A-1D, where the workpieces are planar worksheets 12 and 14 placed in facing contact with each other; worksheet 12 includes a superplastic material (FIG. 1A). The sheets may each have a respective thickness within ranges applicable to ultrasonic bonding, usually falling within a range of about 0.1 mm to about 2 mm. The worksheets are then joined together by ultrasonic welds 15, to form assembly 16 (FIG. 1B). Optionally, a stopping off material 13, for instance yttria, boron nitride, graphite, or alumina, may be applied to one or more localized areas between worksheets 12 and 14 where welding is to be prevented, but this is not normally contemplated as currently available ultrasonic joining techniques can be carried out with location control precise enough to selectively leave unbonded regions.

Figure 1C:
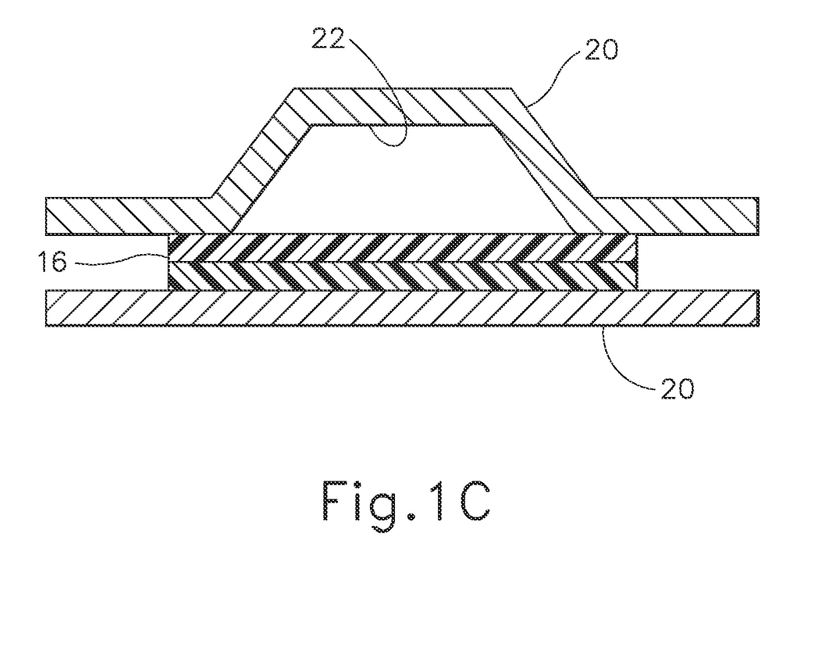
Figure 1D:
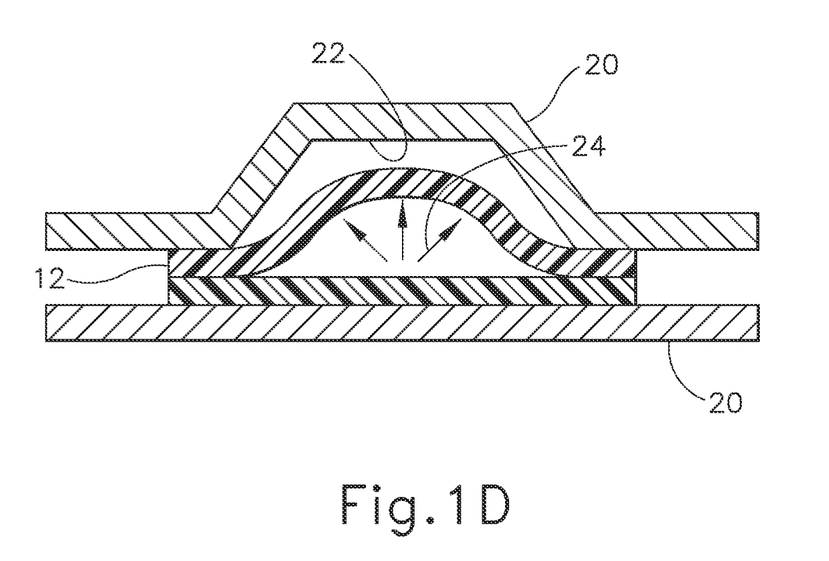

The assembly is then placed between two halves of a die 20 that are pressed together to form a gas tight seal between the edges of the assembly and the internal cavity in the die (FIG. 1C). The assembly is heated to a temperature at which superplastic forming of the superplastic material of worksheet 12 may take place. A fluid, such as an inert gas, is injected between worksheets 12 and 14. This causes worksheet 12 to be urged against an internal face 22 of the die 20, thereby adopting the shape of the internal face 22 (FIG. 1D). The bonds between the worksheets 12 and 14 include those formed by ultrasonic welding prior to the superplastic forming. The ultrasonic welding may be applied at individual spots or along continuous seams. In instances where the assembly 16 is sealed around its outer perimeter by a weld or a bond (not shown), ducts may be included in the assembly of joined worksheets 16, allowing a fluid to be injected into the interstitial region between the worksheets. If necessary, gaps can be left in the ultrasonic welds 15 to allow the passage of fluid between adjacent weld regions.

Figure 2A:
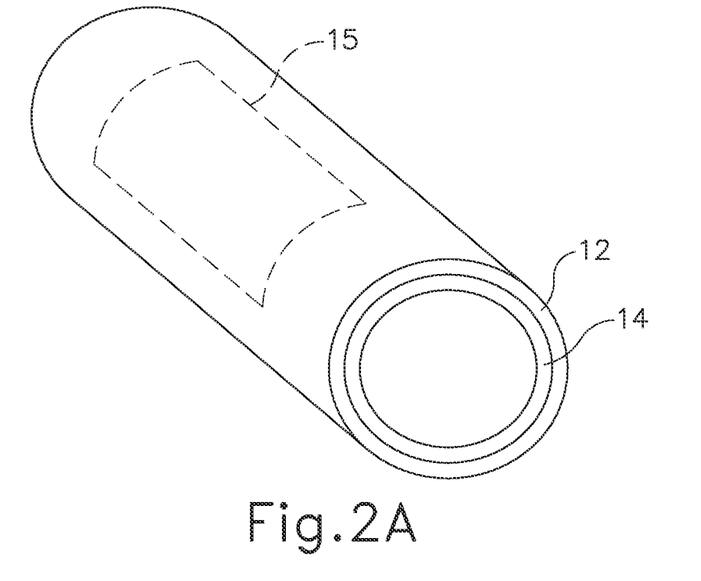
FIGS. 2A-2B illustrate a method of manufacturing a structure by ultrasonic welding, structure forming, and superplastic forming.
Figure 2B:
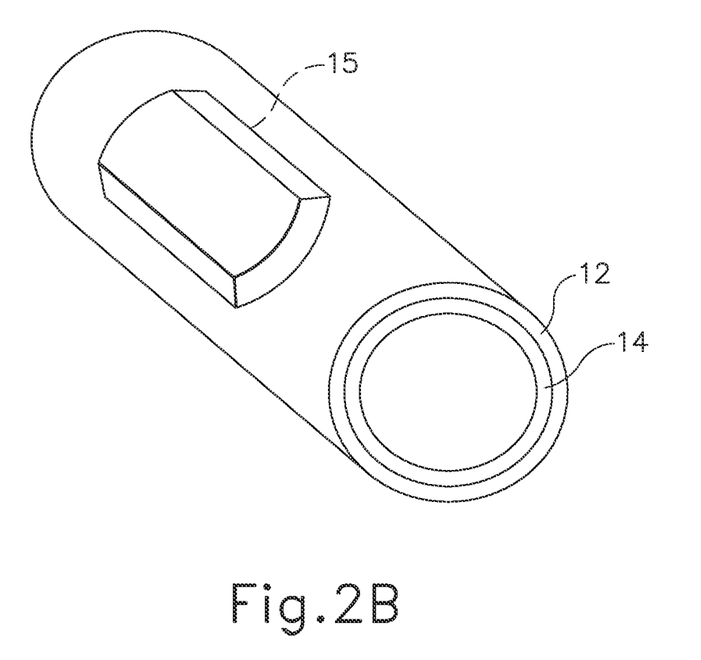

In instances where a product with a shape other than planar is desired, the assembly may be formed to impart a desired shape, dimensions and mechanical properties to a final product. Methods typically used for the sheet forming and the bulk forming of metals and alloys may be applied to obtain such a product. In sheet forming, a planar precursor is deformed by tensile loads into a three-dimensional shape, usually without significant changes in thickness or surface. Typical bulk-forming processes include forging, rolling, drawing, and extrusion. FIGS. 2A-2B illustrate an example process whereby assembly 16 is formed into tubular piece 20 (FIG. 2A) which is in turn subjected to superplastic forming to yield corrugation 22 (FIG. 2B). Alternatively, the forming step may take place after the superplastic forming has taken place.

Advantageously, ultrasonic welding does not require the high temperatures usually associated with traditional joining methods, such as diffusion bonding and brazing. This allows the use of materials having different tolerances to heat. In some examples, worksheet 14 may include a material characterized by a melting point such that heating the sheets to temperature at which the material of worksheet 14 is capable of diffusion bonding would result in a partial or total melting of a material of the other worksheet 12. Since ultrasonic welding does not require such heating, it is suitable for joining materials having different tolerances to heat and the use of heterogeneous workpieces comprising two or more materials having different melting points is also made possible. The ultrasonic welding process may be applied to blanks having one or more sections of materials characterized by a relatively low melting point.

In a set of representative examples, the method is applied to materials that do not lend themselves well to diffusion bonding. Foremost among such materials are aluminum alloys, usually including magnesium, manganese, silicon, and zinc as alloying elements. Representative aluminum alloys, designated according to the International Alloy Designation System, include the following: "1000 series" alloys with a minimum 99% aluminum content by weight; "2000 series" alloyed with copper; "3000 series" alloyed with manganese; "4000 series" alloyed with silicon; "5000 series" alloyed with magnesium; "6000 series" alloyed with magnesium and silicon; "7000 series" alloyed with zinc, and "8000 series" a category mainly used for lithium alloys. Also included are high-strength aluminum alloys finding use in aerospace applications, such as the alloys comprising aluminum, magnesium and scandium that are disclosed in U.S. patent application Ser. No. 12/349,668 (published as U.S. 2010/0170996). Typical magnesium-based alloys include aluminum, zinc, manganese, silicon, copper, zirconium, and rare earths as alloying elements, while common beryllium alloys include one or more of copper, cobalt, nickel, and aluminum. Also contemplated are titanium alloys, as well as steel alloys and nickel alloys.

Figure 3:
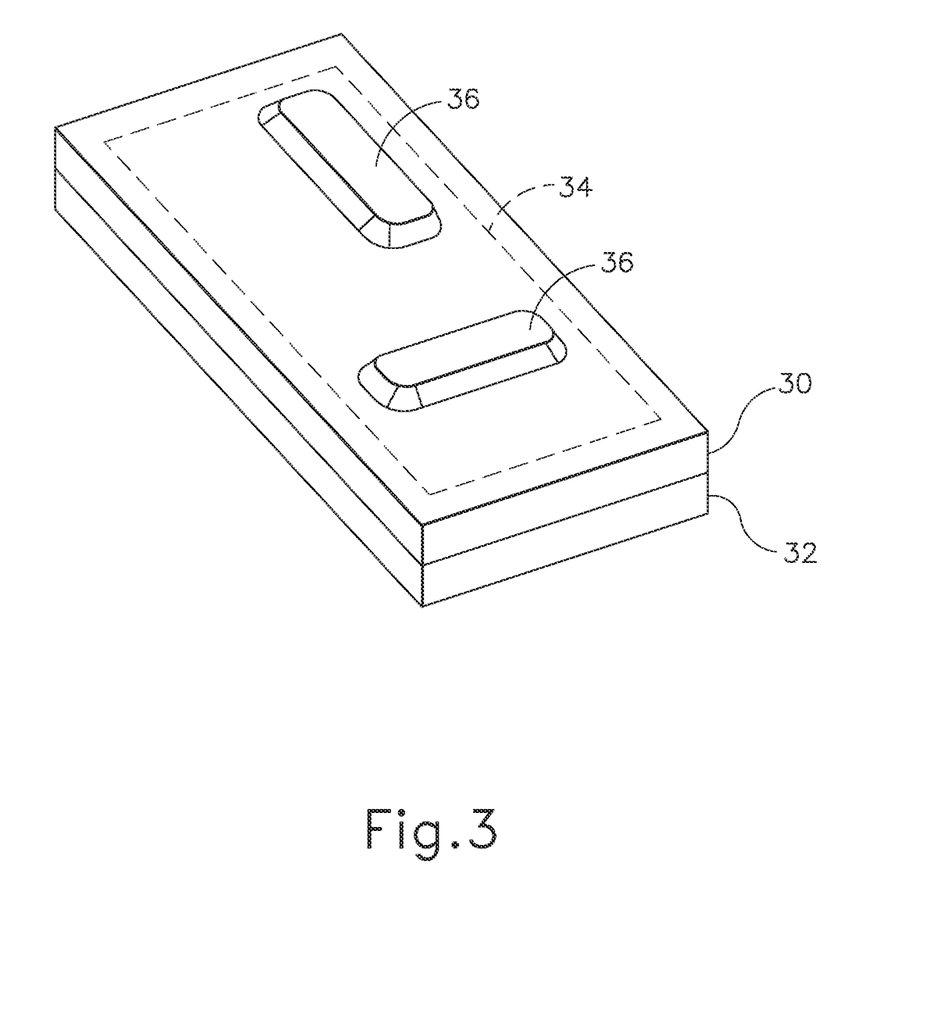
FIG. 3 illustrates a multisheet structure featuring ultrasonic welds and corrugations formed by superplastic forming.

In another aspect, multisheet structures are provided. In such structures, one of the sheets has at least one superplastically formed corrugation and is ultrasonically welded to a second sheet. The first, corrugated sheet may further be attached to the second sheet by other types of bonds, e.g. laser welds and/or friction welds. FIG. 3 illustrates a representative example of such a structure, having outer sheet 30 that is bound to inner sheet 32 by ultrasonic welds 34; outer sheet 30 features superplastically-formed corrugations 36. In exemplary embodiments, outer sheet 30 may be made of a superplastic material, such as a 7000 series aluminum alloy, whereas inner sheet 32 may instead include a material characterized by a lower superplasticity, for instance an aluminum alloy of the 6000 series. Additional bonds between the worksheets may also be present, such as laser welds and friction welds (not shown). Multiple layers of sheets with multiple ultrasonic welds are also contemplated.

In representative examples, the worksheets may include materials that usually do not lend themselves well to diffusion bonding, such as aluminum, magnesium, beryllium and their respective alloys. In other embodiments, a sheet may include more than one material; for instance, outer sheet 30 may include an aluminum alloy and sheet 32 a magnesium alloy or a beryllium alloy. In addition, one of the sheets may include a material characterized by a higher melting point than a material of the other sheet.

Figure 4:
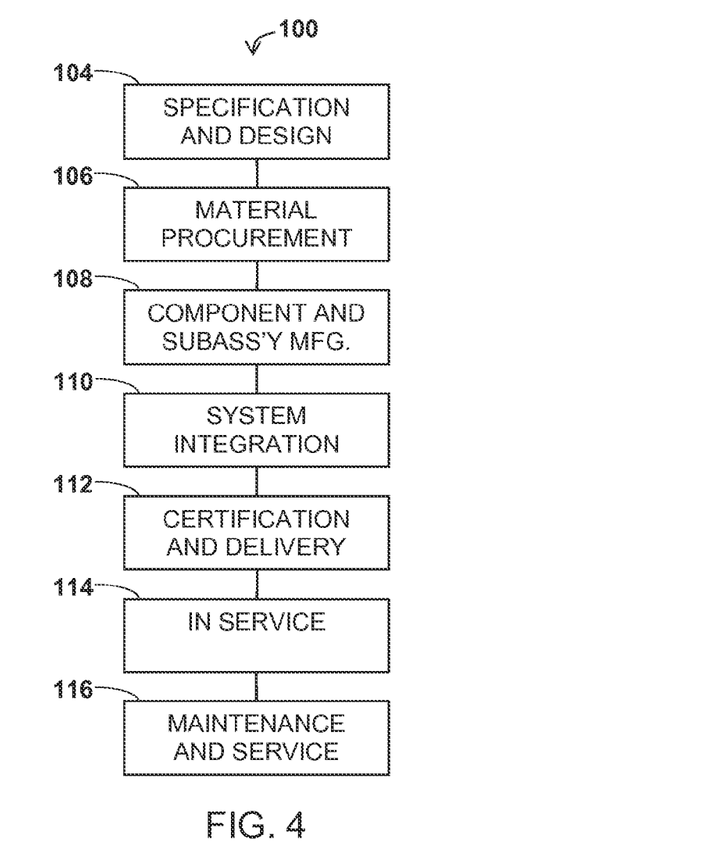
FIG. 4 illustrates a schematic representation of an airframe, interior, and systems of an aircraft.
Figure 5:
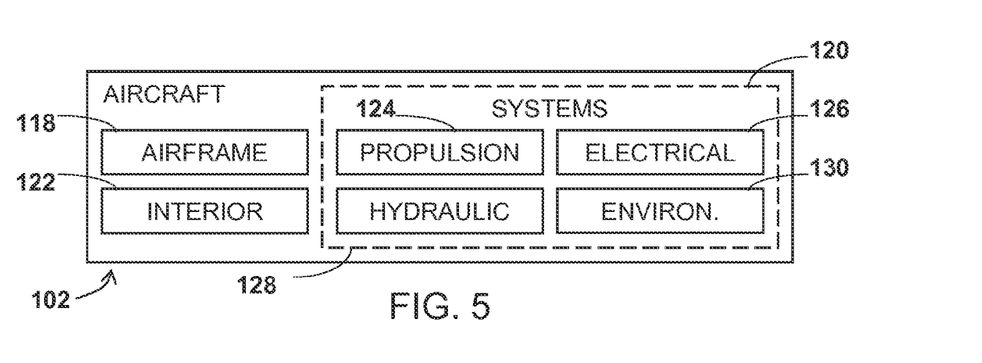
FIG. 5 illustrates an aircraft manufacturing and service method.

The above multisheet structures are ideally suited for a wide range of applications requiring high-strength, low-weight components. In particular, the structures find use in aerospace applications, e.g. in the airframe of an aircraft 102 as shown in FIG. 4 and manufactured and serviced according to the method 100 as shown in FIG. 5. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 5, the aircraft 102 produced by exemplary method 100 may include an airframe 118 with a plurality of systems 120 and an interior 122. Examples of high-level systems 120 include one or more of a propulsion system 124, an electrical system 126, a hydraulic system 126, and an environmental system 130. Any number of other systems may be included. Although an aerospace example is shown, the multisheet structures may be applied to other industries, such as automotive applications.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

It should also be understood, of course, that the foregoing relates to exemplary aspects and embodiments of the disclosure and those modifications may be made without departing from the spirit and scope of the disclosure as set forth in the following claims.

What is claimed is:

1. A structure manufactured by a method comprising:
    forming a first heterogeneous workpiece and a second heterogeneous workpiece by friction welding,
    the first heterogeneous workpiece and the second heterogeneous workpiece having thicknesses of about 0.1 mm to about 2 mm,
        the first heterogeneous workpiece comprising:
            a first side, and
            a second side, wherein a first material of the first side has a melting point different than a second material of the second side, and at least one of the first material of the first side or the second material of the second side has superplastic characteristics; and
        the second heterogeneous workpiece comprising:
            a third side, and
            a fourth side, wherein a third material of the third side has a melting point different than a fourth material of the fourth side, and at least one of the third material of the third side or the fourth material of the fourth side has a melting point higher than at least one of the first material or the second material having superplastic characteristics;
    assembling the first heterogeneous workpiece and the second heterogeneous workpiece, and welding the first workpiece to the second workpiece solely by an ultrasonic welding process, to form an assembly;
    heating the assembly to a temperature at which at least one of the first material or second material is capable of superplastic deformation; and
    injecting a fluid between the first workpiece and the second workpiece to form a cavity between the first workpiece and the second workpiece.

2. The structure manufactured by the method of claim 1, further comprising:
    placing the assembly in a die, and
    when injecting the fluid between the first workpiece and the second workpiece,
    urging at least the first workpiece against an internal face of the die.

3. The structure manufactured by the method of claim 1, further comprising heating the first workpiece and the second workpiece prior to or during the ultrasonically welding the first workpiece and the second workpiece.

4. The structure manufactured by the method of claim 1, further comprising preventing the first workpiece from being ultrasonically welded to the second workpiece in at least one localized area.

5. The structure manufactured by the method of claim 1, wherein the fluid is a gas selected from the group consisting of helium, argon, nitrogen, and combinations thereof.

6. The structure manufactured by the method of claim 1, wherein the friction welding is selected from the group consisting of friction stir welding, linear friction welding, and combinations thereof.

7. The structure manufactured by the method of claim 1, further comprising forming the assembly, wherein the forming is selected from the group consisting of sheet forming, bulk forming, and combinations thereof.

8. The structure manufactured by the method of claim 1, wherein the forming is effected prior to or following forming the cavity.

9. The structure manufactured by the method of claim 1, wherein at least one of the first and second workpieces is a planar worksheet.

10. The structure manufactured by the method of claim 1, wherein heating the assembly to the temperature further comprises heating the assembly to a temperature at which the first material, second material, third material, or fourth material is capable of superplastic deformation.

11. The structure manufactured by the method of claim 1, wherein at least one of the first material, second material, third material, or fourth material is selected from the group consisting of an aluminum alloy, a magnesium alloy, a beryllium alloy, a titanium alloy, a steel alloy, a nickel alloy, and combinations thereof.

12. The structure manufactured by the method of claim 1, wherein at least one of the first material, second material, third material, or fourth material comprises an alloy comprising aluminum and an element selected from the group consisting of copper, manganese, silicon, magnesium, zinc, lithium, and combinations thereof.

13. The structure manufactured by the method of claim 1, wherein at least one of the first material, second material, third material, or fourth material comprises an alloy comprising magnesium and an element selected from the group consisting of aluminum, zinc, manganese, silicon, copper, zirconium, a rare earth, and combinations thereof.

14. The structure manufactured by the method of claim 1, wherein at least one of the first material, second material, third material, or fourth material comprises an alloy comprising beryllium and an element selected from the group consisting of copper, cobalt, nickel, aluminum, and combinations thereof.

15. The structure manufactured by the method of claim 1, further comprising applying a stopping off material to a localized area between the first workpiece and the second workpiece.

16. The structure manufactured by the method of claim 15, further comprising preventing the first workpiece from being ultrasonically welded to the second workpiece with the stopping off material at the localized area.

17. The structure manufactured by the method of claim 15, wherein the stopping off material is selected from the group consisting of yttria, boron nitride, graphite, alumina, and combinations thereof.

18. A structure manufactured by a method comprising:
assembling a plurality of workpieces having thicknesses of about 0.1 mm to about 2 mm, the plurality of workpieces comprising:
a first heterogeneous workpiece comprising:
a first side and a second side, wherein a first material of the first side has a melting point different than a second material of the second side, and at least one of the first material of the first side or the second material of the second side has superplastic characteristics; and
a second heterogeneous workpiece comprising:
a third side and a fourth side wherein a third material of the third side has a melting point different than a fourth material of the fourth side, and at least one of the third material of the third side or the fourth material of the fourth side has a melting point higher than at least one of the first material or second material having superplastic characteristics;
welding the first workpiece to the second workpiece solely by an ultrasonic welding process, to form an assembly;
heating the assembly to a temperature at which at least one of the first material or the second material having superplastic characteristics is capable of superplastic deformation; and
injecting a fluid between the first workpiece and the second workpiece to form a cavity between the first workpiece and the second workpiece;
wherein at least one of the first and second workpieces that is a heterogeneous workpiece is a friction stir, rotary friction, or linear friction welded blank.

19. The structure manufactured by the method claim 18, further comprising:
placing the assembly in a die, and
when injecting the fluid between the first workpiece and the second workpiece,
urging at least the first workpiece against an internal face of the die.

20. The structure manufactured by the method of claim 18, further comprising heating the first workpiece and the second workpiece prior to or during the ultrasonically welding the first workpiece and the second workpiece.

21. The structure manufactured by the method of claim 18, further comprising preventing the first workpiece from being ultrasonically welded to the second workpiece in at least one localized area.

22. The structure manufactured by the method of claim 18, wherein the fluid is a gas selected from the group consisting of helium, argon, nitrogen, and combinations thereof.

23. The structure manufactured by the method of claim 18, further comprising forming the assembly, wherein the forming is selected from the group consisting of sheet forming, bulk forming, and combinations thereof.

24. The structure manufactured by the method of claim 23, wherein the forming is effected prior to or following forming the cavity.

25. The structure manufactured by the method of claim 18, wherein at least one of the first and second workpieces is a planar worksheet.

26. The structure manufactured by the method of claim 18, wherein heating the assembly to the temperature further comprises heating the assembly to a temperature at which at least one of the first material, second material, third material, or fourth material is capable of superplastic deformation.

27. The structure manufactured by the method of claim 18, wherein at least one of the first material, second material, third material, or fourth material is selected from the group consisting of an aluminum alloy, a magnesium alloy, a beryllium alloy, a titanium alloy, a steel alloy, a nickel alloy, and combinations thereof.

28. The structure manufactured by the method of claim 18, wherein at least one of the first material, second material, third material, or fourth material comprises an alloy comprising aluminum and an element selected from the group consisting of copper, manganese, silicon, magnesium, zinc, lithium, and combinations thereof.

29. The structure manufactured by the method of claim 18, wherein at least one of the first material, second material, third material, or fourth material comprises an alloy comprising magnesium and an element selected from the group consisting of aluminum, zinc, manganese, silicon, copper, zirconium, a rare earth, and combinations thereof.

30. The structure manufactured by the method of claim 18, wherein at least one of the first material, second material, third material, or fourth material comprises an alloy comprising beryllium and an element selected from the group consisting of copper, cobalt, nickel, aluminum, and combinations thereof.

31. The structure manufactured by the method of claim 18, further comprising applying a stopping off material to a localized area between the first workpiece and the second workpiece.

32. The structure manufactured by the method of claim 31, further comprising preventing the first workpiece from being ultrasonically welded to the second workpiece with the stopping off material at the localized area.

33. The structure manufactured by the method of claim 31, wherein the stopping off material is selected from the group consisting of yttria, boron nitride, graphite, alumina, and combinations thereof.

34. A multisheet structure comprising:
a first heterogeneous sheet having a thickness of about 0.1 mm to about 2 mm, comprising:
a first side and a second side, wherein a first material of the first side has a melting point different than a second material of the second side, and at least one of the first material of the first side or the second material of the second side has superplastic characteristics;
a plurality of sections friction welded together;
at least one corrugation; and
a second heterogeneous sheet having a thickness of about 0.1 mm to about 2 mm and welded to the first sheet solely by ultrasonic welding, comprising:
a third side and a fourth side, wherein a third material of the third side has a melting point different than a fourth material of the fourth side, and at least one of the third material of the third side or the fourth material of the fourth side has a melting point higher than at least one of the first material or second material having superplastic characteristics; and
a plurality of sections friction welded together;
wherein the at least one corrugation is formed by heating the first sheet and the second sheet to a temperature at which at least one of the first material or second material is capable of superplastic deformation and injecting a fluid between the first sheet and the second sheet.

35. The multisheet structure of claim 34, wherein at least one of the first and second sheets comprises an aluminum alloy.

36. The multisheet structure of claim 34, wherein at least one of the first and second sheets comprises a magnesium alloy.

37. The multisheet structure of claim 34, wherein at least one of the first and second sheets comprises an alloy selected from the group consisting of a beryllium alloy, a titanium alloy, a steel alloy, a nickel alloy, and combinations thereof.

38. The multisheet structure of claim 34, wherein the first sheet comprises a first aluminum alloy, and the second sheet comprises a second aluminum alloy.

39. The multisheet structure of claim 34, wherein the first sheet comprises an aluminum alloy, and the second sheet comprises a magnesium alloy.

40. An airframe comprising:
a first heterogeneous sheet having a thickness of about 0.1 mm to about 2 mm, comprising:
a first side and a second side, wherein a first material of the first side has a melting point different than a second material of the second side, and at least one of the first material of the first side or the second material of the second side has superplastic characteristics;
a plurality of sections friction welded together;
at least one corrugation; and
a second heterogeneous sheet having a thickness of about 0.1 mm to about 2 mm and welded to the first sheet solely by ultrasonic welding, comprising:
a third side and a fourth side, wherein a third material of the third side has a melting point different than a fourth material of the fourth side, and at least one of the third material of the third side or the fourth material of the fourth side has a melting point higher than at least one of the first material or second material having superplastic characteristics; and
a plurality of sections friction welded together;
wherein the at least one corrugation is formed by heating the first sheet and the second sheet to a temperature at which at least one of the first material or the second material is capable of superplastic deformation and injecting a fluid between the first sheet and the second sheet.

41. An aircraft comprising the airframe of claim 40.

\* \* \* \* \*

UNITED STATES PATENT AND TRADEMARK OFFICE
CERTIFICATE OF CORRECTION

PATENT NO. : 9,527,571 B2  Page 1 of 1
APPLICATION NO. : 14/338586
DATED : December 27, 2016
INVENTOR(S) : Kevin Slattery It is certified that error appears in the above-identified patent and that said Letters Patent is hereby corrected as shown below:

On the Title Page

Item (73), in Column 1, in "Assignee", Line 1, delete "Beoing" and insert -- Boeing --, therefor.

In the Claims

In Column 7, Line 59, in Claim 19, after "method" insert -- of --.

Signed and Sealed this
Fourteenth Day of March, 2017

Michelle K. Lee
*Director of the United States Patent and Trademark Office*